United States Patent
Mrva et al.

(10) Patent No.: US 6,192,348 B1
(45) Date of Patent: *Feb. 20, 2001

(54) METHOD FOR COMPILING ACCOUNTING DATA FOR THE UTILIZATION OF PROGRAMMED SERVICES OR SERVICES AVAILABLE VIA A PROGRAM

(75) Inventors: Michel Mrva, Putzbrunn; Klaus Buchenrieder, Riemerling, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/980,111

(22) Filed: Nov. 26, 1997

(30) Foreign Application Priority Data

Nov. 29, 1996 (DE) ............................... 196 49 693

(51) Int. Cl.[7] .................................................. G06F 17/60
(52) U.S. Cl. ............................... 705/52; 705/30; 705/32; 705/1; 707/104
(58) Field of Search ................... 705/30, 32, 1, 705/400, 52, 59; 395/200.53, 200.54, 200.55; 707/104

(56) References Cited

U.S. PATENT DOCUMENTS

| | | | |
|---|---|---|---|
| 4,361,851 | * 11/1982 | Asip et al. ............................... 348/3 |
| 5,047,928 | * 9/1991 | Wiedemer ............................... 380/4 |
| 5,388,211 | * 2/1995 | Hornbuckle ............................ 395/712 |
| 5,469,497 | * 11/1995 | Pierce et al. ............................ 379/115 |
| 5,553,239 | * 9/1996 | Heath et al. ............................ 380/25 |
| 5,592,549 | * 1/1997 | Nagel et al. ............................ 380/4 |
| 5,682,478 | * 10/1997 | Watson et al. ....................... 395/200.59 |
| 5,694,549 | * 12/1997 | Carlin et al. ......................... 395/200.8 |
| 5,812,661 | * 9/1998 | Akiyama et al. ....................... 380/4 |
| 5,812,784 | * 9/1998 | Watson et l. ....................... 395/200.57 |
| 5,826,252 | * 10/1998 | Wolters, Jr. et al. .................... 707/1 |
| 5,857,020 | * 1/1999 | Peterson, Jr. ............................ 380/4 |
| 5,960,409 | * 9/1999 | Wexler .................................. 705/14 |
| 5,983,004 | * 11/1999 | Shaw et al. ............................ 709/227 |
| 6,009,414 | * 12/1999 | Hoshiya et al. ........................ 705/30 |

FOREIGN PATENT DOCUMENTS 8-181794 * 7/1996 (JP).

OTHER PUBLICATIONS

IBM TEchnical Disclosure Bulletin, vol. 38, No. 7, pp. 511–516, "Dynamic Load Sharing for Distributed Computing Environment," Jul. 1995.*

* cited by examiner

Primary Examiner—James P. Trammell
Assistant Examiner—Nicholas David Rosen
(74) Attorney, Agent, or Firm—Schiff Hardin & Waite

(57) ABSTRACT

The method interactively enables a switching over of the acquisition of charges during the utilization of programmed services or services available via a program. The charge acquisition can be switched over to a personal account, for example, during an Internet session. In a multitasking environment, a separate accounting manager that communicates with an accounting program that runs in parallel in the user environment is provided for each net browser.

6 Claims, 3 Drawing Sheets

METHOD FOR COMPILING ACCOUNTING DATA FOR THE UTILIZATION OF PROGRAMMED SERVICES OR SERVICES AVAILABLE VIA A PROGRAM

BACKGROUND OF THE INVENTION

Field of the Invention

In the use of programmed services or services that are available via a program, for example the Internet via an internet browser, an accounting for the use of the services ensues via the apparatus from which the service is called.

SUMMARY OF THE PRESENT INVENTION

The problem underlying the present invention is to compile accounting data during the utilization of programmed services or services that are available via a program which are differentiated, for example, according to purpose (such as, personal or business use).

The problem is solved by the method for compiling accounting data for the utilization of program services or services available via a program, a) starting two processes, one for the accounting program and one for the user interface, at the start of a multitasking environment, b) starting an accounting manager of the program for the utilization of programmed services or services available via a program with the start of a program for the utilization of programmed services or services available via a program under the user interface, c) sending accounting data to the process for the accounting program by the accounting manager.

The compiling of the accounting data for the utilization of programmed services or services that are available via a program are interactively implemented. The user can change the accounting mode, for example from business use to personal use, for example by pressing a field in the internet browser or other network access software. A multitasking operating system can be assumed whereby the accounting program is already started invisibly in the background as a separate task at the start of the user-specific environment. The start of the program for the utilization of programmed services or services that are available via a program starts an accounting manager that is specific for this program. The accounting manager communicates with the accounting program and transmits, for example, user-specific accounting data.

Further, the present method supports the controlled access to different services; and a detailed accounting of various services is possible in addition to the cost-saving and time-saving display. In other words, the display of the information encourages the user to save time and costs. Moreover, the acquired data should be able to be further processed electronically, and data protection regulations are adhered to.

An advantageous development of the method of the invention is the capability for parallel accounting of a plurality of programs for the utilization of programmed services or services which are available via a program. Each of these programs has a separate accounting manager at its disposal, and each of these accounting managers communicates with the accounting program.

Another advantageous embodiment is comprised in the versatile possibilities for the switching of the acquisition of accounting data. The switching can thus ensue, for example, by the above mentioned field in the net browser or other network access software or it can be automatically coupled to the calling up of different services.

Further developments of the method of the invention include starting a plurality of programs for the utilization of programmed services or services available via a program and starting the corresponding accounting managers, each accounting manager communicating with the accounting program. The present method may also include realizing the switching to user-specific acquisition of accounting data for individual users of programmed services or services available via a program in a graphic form or a textual or icon-based or sensor-based or a dynamic form.

BRIEF DESCRIPTION OF THE DRAWINGS

The invention is explained further with reference to exemplary embodiments that are shown in the Figures.

DETAILED DESCRIPTION OF THE PREFERRED EMBODIMENTS

Figure 1:
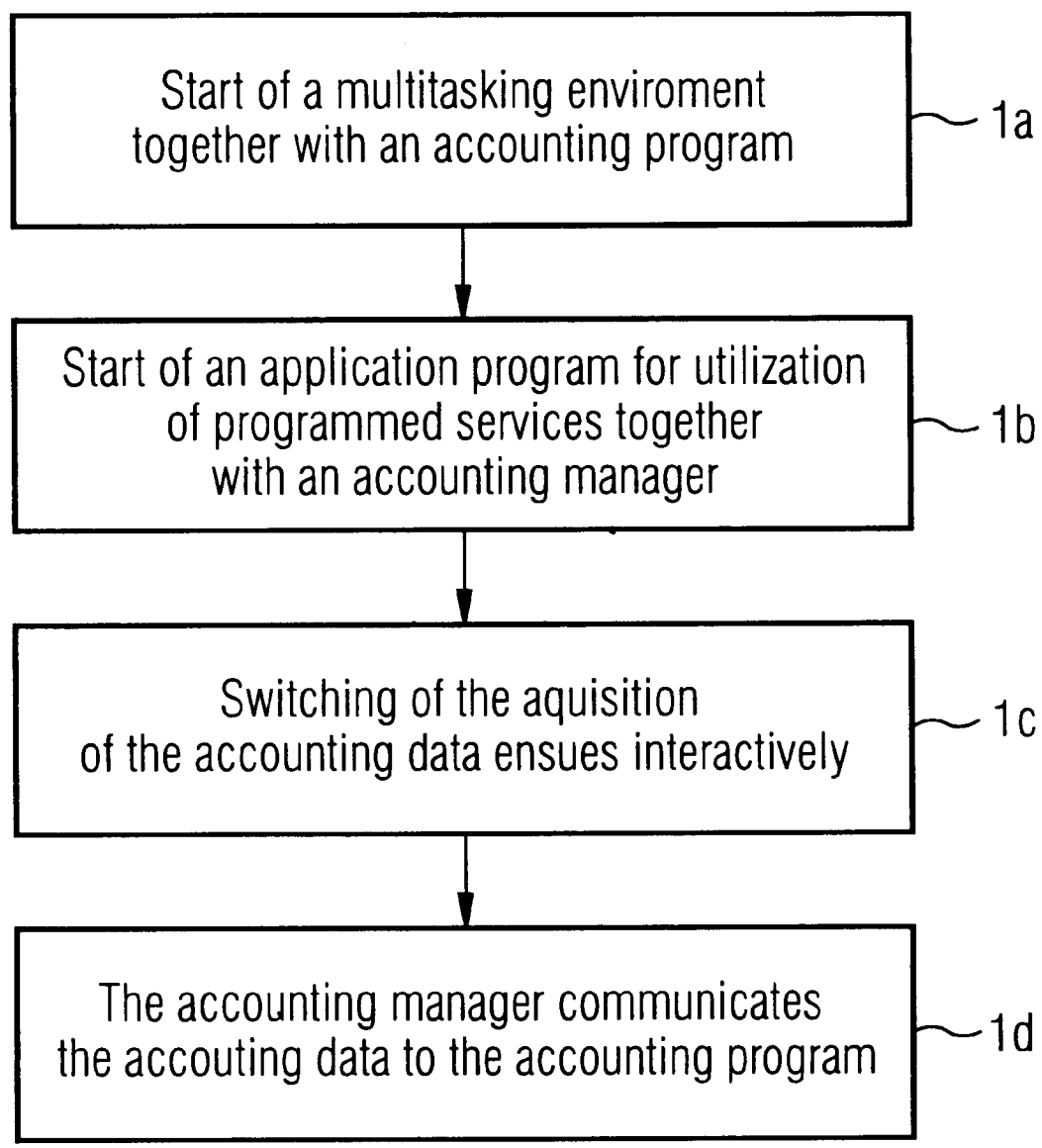
FIG. 1 is a flow chart which shows the individual method steps according to the present invention.

The individual method steps of the method of the invention are shown in a flow chart in FIG. 1. With the start of a multitasking environment, for example, during the log-on of a user under the UNIX operating system, an accounting program is started in the background (step 1a). This accounting program is invisible to the user and is only accessible by a user (or by a plurality of users) who has specific rights, for example, administrative rights—under UNIX, this can be the ROOT identifier. When the user starts an application program for the utilization of programmed services or services which are available via a program, an accounting manager component that belongs to this application program is simultaneously started (step 1b). The accounting manager component records accounting data, which reflect the use of the application program in terms of time and/or charges incurred, for example. A switching of the acquisition of the accounting data can ensue interactively (see FIG. 1, step 1c) during the utilization of the application program. Finally, the accounting manager communicates the accounting data to the accounting program (step 1d).

An advantageous development of the method of the invention is that when a plurality of application programs for the utilization of programmed services or services available via a program are used, the user-specific accounting data on the use of each program is exchanged with the accounting program independently from one another.

Furthermore, it is advantageous to implement the interaction of the accounting data in various ways, for example by a switch button on the interface of the application program or by a permanent interlink of the switching of the type of accounting to a menu that, for example, enables access to topics which are of personal interest.

Figure 2:
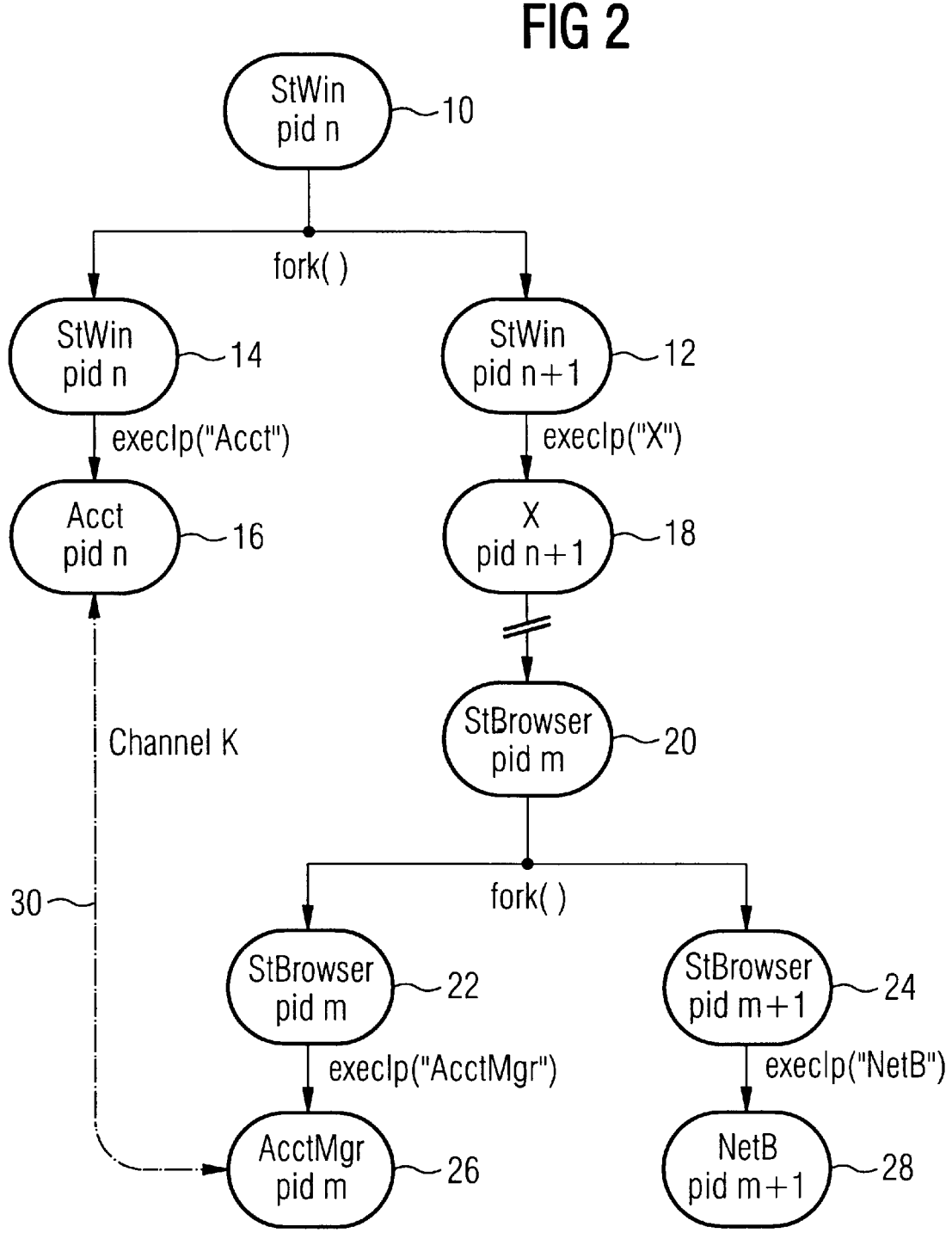
FIG. 2 is a program flow chart which shows the basic structure of a program-oriented solution, and, FIG. 3 is a program flow chart showing an exemplary embodiment for the communication of a plurality of applications for the utilization of programmed services or services available via a program with the accounting program.

An exemplary embodiment on a UNIX system with an X-windows interface is shown in FIG. 2. Any other multitasking operating system can be used as an alternative to the UNIX operating system. The schematic execution begins with the calling of the windows interface StWin with the process identification 'pid n' at 10, whereby a second identical process StWin with the process identification 'pid n+1' at 12 is implicitly initiated by the "fork" command. The one process with the process identification 'pid n' at 14 is defined as an accounting program Acct at 16 by the call execlp ("Acct"). The X-windows interface X is started simultaneously as a parallel process at 18 by the command execlp ("X"). The accounting program thereby runs in the background, invisible to the user.

Programs can be called as desired in the X-windows interface. When an application is started with the process identification 'pid m' at 20 for the utilization of programmed services or available via a program, (a browser) StBrowser at 22, a second identical process StBrowser with the process identification 'pid m at 24 +1' is implicitly started by the fork command. An accounting manager AcctMgr at 26 is initiated with the help of the command execlp ("AcctMgr") and, with exelcp ("NetB"), an application program is initiated at 28 for the utilization of programmed services or services available via a program. When the user, for example, decides to use the browser for personal services while it is running, this information is sent from the accounting manager AcctMgr to the accounting program Acct by a signal, a pipe, or a message via a channel K at 30. Since the process identification pid of the application is known to the accounting manager AcctMgr, additional data such as the memory requirements, input/output traffic volume, etc., can also be transmitted to the accounting program with the corresponding request.

Figure 3:
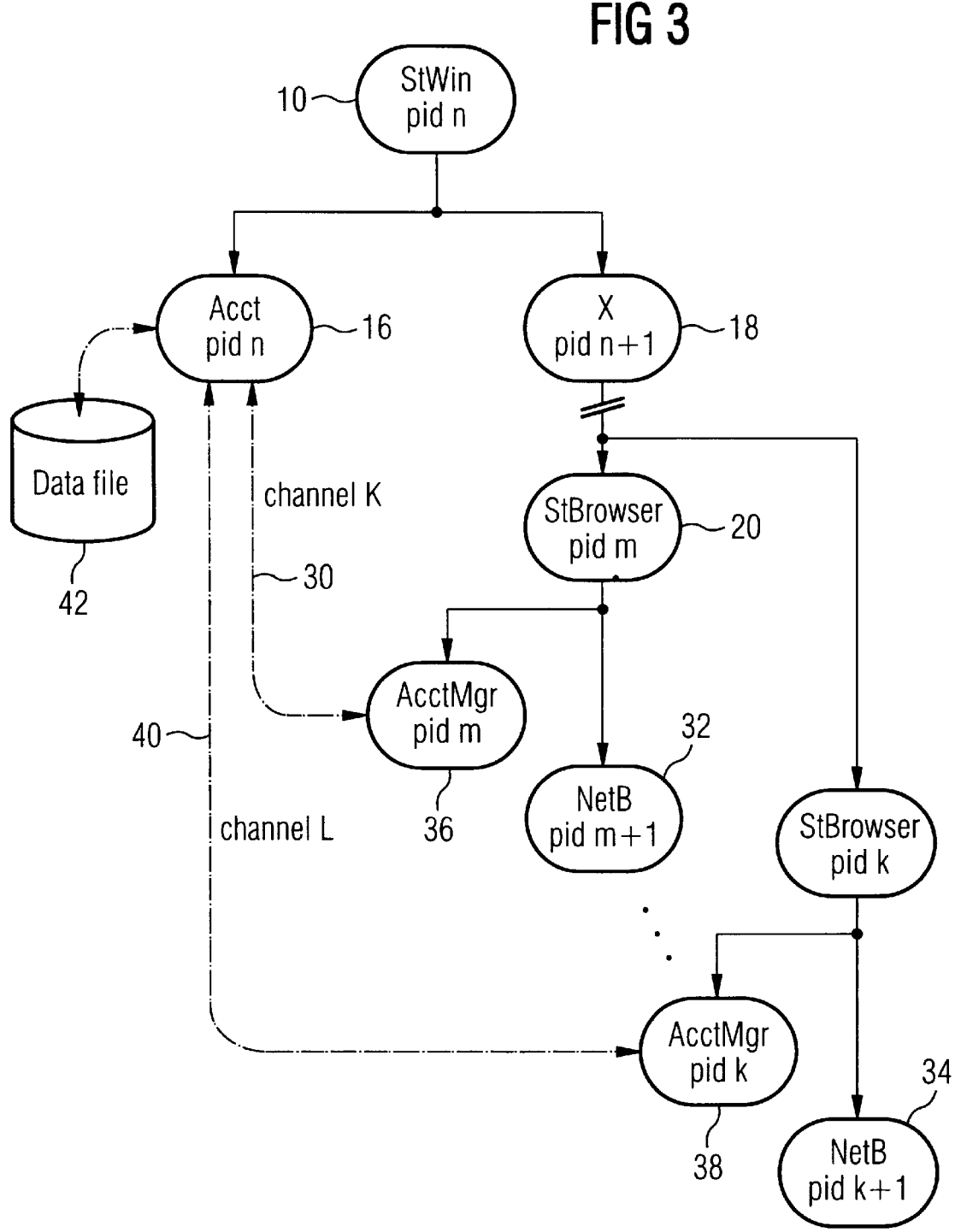

FIG. 3 shows the multiple instancing of the browser NetB and the communication of the accounting manager AcctMgr that exists for each browser NetB with the accounting program Acct. The fork mechanism as present, for example, in a UNIX system can be used in order to concurrently run a plurality of applications without mutual influence and to acquire operation related data in a differentiated manner. In FIG. 3, for example, a plurality of browsers NetB are started with the process identifications 'pid m+1' and 'pid k+1' at 32 and 34, respectively, under an X-windows interface X. An accounting manager AcctMgr at 36 and 35, respectively that, for example sends messages to the accounting program Acct via a channel K or L at 30 and 40, respectively, exists concurrently for each browser NetB. Processed data from the accounting program Acct are deposited in a data file 42 which only the accounting program can access.

The present method, thus, acquires charge or billing information or time tracking information as accounting data during use of an account on a network, such as the internet. The accounting data is transferred to an accounting program. Multiple instances of network access software running in a multi-tasking environment are accounted by separate accounting managers for each instance of the access software. The present invention, thus, permits record keeping for internet use, for example, by a user.

Although other modifications and changes may be suggested by those skilled in the art, it is the intention of the inventors to embody within the patent warranted hereon all changes and modifications as reasonably and properly come within the scope of their contribution to the art.

We claim:

1. A method for compiling accounting data for use of program services or services available via a program, comprising the steps of:
   a) starting two processes, at a start of a multitasking environment, one of said processes for an accounting program and another of said processes for a user interface;
   b) starting an accounting manager of a program for use of programmed services or services available via a program with a start of the program for use of programmed services or services available via a program under the user interface;
   c) sending accounting data to the one process for the accounting program by the accounting manager; and
   d) providing a plurality of user selectable accounting modes depending on a use by the user.

2. A method according to claim 1, further comprising:
   starting a plurality of programs for use of programmed services or services available via a program and starting corresponding accounting managers, each of the accounting managers communicating with the accounting program.

3. A method according to claim 1, further comprising:
   realizing switching to user-specific acquisition of accounting data for individual users of programmed services or services available via a program in one of a graphic form and a textual form and an icon-based form and a sensor-based form and a dynamic form.

4. A method for compiling data on use of program services, comprising the steps of:
   providing a multitasking user interface;
   providing an accounting program in the multitasking user interface;
   starting multiple instances of a program for use of program services in the multitasking user interface, wherein said program services are access to a computer network and said program for use of program services is a browser program;
   starting corresponding multiple instances of an accounting manager corresponding to the program for use of program services substantially simultaneously with said start of the program for use of program services;
   sending accounting data for all instances of the program for use of program data from the accounting manager to the accounting program, the accounting data reporting on use of the program services via the program for use of program services; and
   parallel accounting of the accounting data for all instances of the program for use of program data by the accounting manager to the accounting program.

5. A method for compiling data on use of program services, comprising the steps of:
   providing a multitasking user interface;
   providing an accounting program in the multitasking user interface;
   starting a program for use of program services in the multitasking user interface, said program being capable of at least two modes of use;
   starting an accounting manager corresponding to the program for use of program services substantially simultaneously with said start of the program for use of program services;
   providing a user selectable operator to permit a user to select at least one of said at least two modes of use; and
   sending accounting data from the accounting manager to the accounting program, the accounting data reporting on use of the program services via the program for use of program services, said accounting data reporting use of the program services for each mode of use selected by the user.

6. A method as claimed in claim 5, wherein said at least two modes of use include a business use mode and a personal use mode.

* * * * *